United States Patent
Wight

(10) Patent No.: US 6,183,549 B1
(45) Date of Patent: Feb. 6, 2001

(54) INK COMPOSITIONS CONTAINING MONOAZO DYES

(75) Inventor: Paul Wight, Manchestser (GB)

(73) Assignee: Avecia Limited, Manchester (GB)

( * ) Notice: Under 35 U.S.C. 154(b), the term of this patent shall be extended for 0 days.

(21) Appl. No.: 09/384,373

(22) Filed: Aug. 27, 1999

(30) Foreign Application Priority Data

Aug. 28, 1998 (GB) .................................................. 9818689

(51) Int. Cl.$^7$ .......................... C09D 11/02; C07C 245/08; C07C 245/18
(52) U.S. Cl. ...................... 106/31.51; 534/839; 534/841; 534/862; 534/879
(58) Field of Search .................. 106/31.51; 534/839, 534/841, 862, 879

(56) References Cited

U.S. PATENT DOCUMENTS

| | | | |
|---|---|---|---|
| 4,864,324 | 9/1989 | Shirota et al. | 346/1.1 |
| 5,017,227 | * 5/1991 | Koike et al. | 106/31.51 |
| 5,074,914 | * 12/1991 | Shirota et al. | 106/31.51 |
| 5,135,571 | * 8/1992 | Shirota et al. | 106/31.51 |
| 5,254,160 | * 10/1993 | Beach et al. | 106/31.51 |
| 5,429,671 | * 7/1995 | Yamamoto | 106/31.51 |
| 5,476,541 | * 12/1995 | Tochihara | 106/31.51 |
| 5,494,507 | * 2/1996 | Beach et al. | 106/31.51 |
| 5,542,970 | * 8/1996 | Miura et al. | 106/31.51 |
| 5,700,314 | * 12/1997 | Kurbayashi et al. | 106/31.51 |
| 5,734,403 | 3/1998 | Suga et al. | 347/101 |

FOREIGN PATENT DOCUMENTS

| | | | |
|---|---|---|---|
| 0 588 316 A2 | 3/1994 | (EP) | C09D/11/00 |
| 60-81250 | 5/1985 | (JP) | C09B/33/10 |
| 60-81266 | 5/1985 | (JP) | C09D/11/00 |
| 62-199667 | 3/1987 | (JP) | C09D/11/00 |
| 62-199665 | 9/1987 | (JP) | C09D/11/00 |
| 1-141966 | 6/1989 | (JP) | C09D/11/00 |

* cited by examiner

*Primary Examiner*—Helene Klemanski
(74) *Attorney, Agent, or Firm*—Pillsbury Madison & Sutro LLP

(57) ABSTRACT

Compounds of Formula (1) and salts thereof:

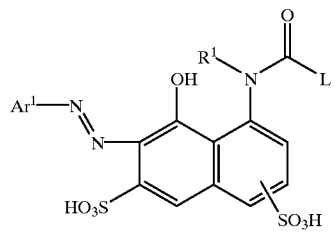

Formula (1)

wherein:
- $Ar^1$ is substituted aryl wherein at least one substituent is —COOH;
- $R^1$ is H or optionally substituted alkyl;
- L is substituted phenyl carrying at least one substituent at the 2-position, or optionally substituted naphthyl.

Also claimed are compositions comprising a compound of the Formula (1) and a water-soluble magenta dye, liquid compositions, especially inks, containing a compound of Formula (1), an ink jet printing process using the inks, a substrate printed with the inks, and an ink jet printer cartridge and an ink jet printer containing the inks.

14 Claims, No Drawings

INK COMPOSITIONS CONTAINING MONOAZO DYES

This invention relates to dyes, to inks, to compositions and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

According to the present invention there is provided a compound of Formula (1) and salts thereof:

Formula (1)

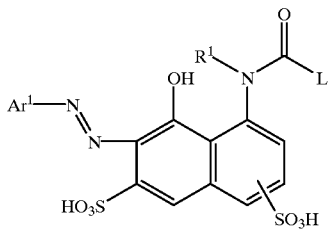

wherein:
$Ar^1$ is substituted aryl carrying at least one —COOH group;
$R^1$ is H or optionally substituted alkyl;
L is substituted phenyl carrying at least one substituent at the 2-position, or optionally substituted naphthyl.

Preferably the compound of Formula (1) is a mono-azo compound (i.e. it contains only one —N=N— group).

Preferably $R^1$ is H or optionally substituted $C_{1-6}$-alkyl, more preferably H or $C_{1-4}$-alkyl optionally substituted by —OH, —COOH, —SO$_3$H or —CN. It is especially preferred that $R^1$ is methyl, ethyl or H, more especially H.

$Ar^1$ is preferably substituted naphthyl or, more preferably, substituted phenyl, wherein at least one of the substituents is —COOH. It is especially preferred that $Ar^1$ is a group of the Formula (2):

Formula (2)

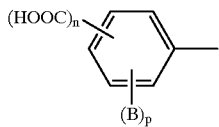

wherein:
each B independently is a substituent other than H;
p is 0 to 4;
n is 1 or 2; and
(n+p) is 5 or less.

Preferably each B independently is —SO$_3$H, —PO$_3$H$_2$, —CF$_3$, optionally substituted alkoxy, optionally substituted alkyl, optionally substituted amino, halo, —CN, —OH, —NO$_2$ or —SO$_2$W; wherein W is optionally substituted alkyl (preferably optionally substituted $C_{1-10}$-alkyl), optionally substituted aryl (preferably optionally substituted phenyl), —NR$^2$R$^3$, vinyl or a group convertible to vinyl on treatment with aqueous alkali; and $R^2$ and $R^3$ are each independently H, optionally substituted alkyl or optionally substituted aryl, or $R^2$ and $R^3$ together with the nitrogen to which they are attached form an optionally substituted piperazinyl, morpholinyl or piperidinyl ring.

Preferably $R^2$ and $R^3$ are each independently H, optionally substituted $C_{1-10}$-alkyl or optionally substituted phenyl, more preferably H, optionally substituted $C_{1-6}$-alkyl or optionally substituted phenyl.

When W is a group which is convertible to vinyl on treatment with aqueous alkali it is preferably of the formula —CH$_2$CH$_2$OSO$_3$H, —CH$_2$CH$_2$SSO$_3$H, —CH$_2$CH$_2$Cl or —CH$_2$CH$_2$OCOCH$_3$. Preferably W is —NR$^2$R$^3$, —CH=CH$_2$ or —CH$_2$CH$_2$OSO$_3$H and especially —CH=CH$_2$ or —NR$^2$R$^3$, wherein $R^2$ and $R^3$ are as hereinbefore defined. In a preferred embodiment each B independently is —SO$_3$H, —PO$_3$H$_2$, —CF$_3$, optionally substituted $C_{1-10}$-alkyl, optionally substituted $C_{1-10}$-alkoxy, optionally substituted amino, —F —Cl, —Br, —CN, —OH, —NO$_2$ or —SO$_2$NR$^2$R$^3$, wherein $R^2$ and $R^3$ are as hereinbefore defined.

When B, $R^2$ or $R^3$ is substituted the substituent(s) is/are preferably selected from $C_{1-4}$-alkyl, $C_{1-4}$-hydroxyalkyl, $C_{1-4}$-alkoxy, $C_{1-4}$-alkylCO, —OH, —SO$_3$H, —COOH, —PO$_3$H$_2$, halo and —NH$_2$.

It is especially preferred that each B independently is —SO$_3$H, —CF$_3$, —NH$_2$, halo, —NHCOC$_{1-4}$-alkyl (preferably —NHCOCH$_3$), $C_{1-6}$-alkoxy, —SO$_2$NHC$_{1-4}$-alkyl, —SO$_2$NHC$_{1-4}$-hydroxyalkyl or $C_{1-6}$-alkyl optionally substituted by —OH, —COOH, —NH$_2$ or —SO$_3$H.

When $Ar^1$ is a group of the Formula (2), preferably p=0 and n=1 or 2. It is especially preferred that p=0, n=1 and that the —COOH group is attached ortho to the azo group shown in Formula (1).

When $Ar^1$ is substituted naphthyl it is preferably substituted by one —COOH and optionally one or more of the hereinbefore defined groups B. This —COOH group is preferably attached ortho to the azo group shown in Formula (1). An especially preferred substituted naphthyl group represented by $Ar^1$ is an optionally substituted 1-carboxynaphth-2-yl group.

Preferably L is of the Formula (3) or (4):

Formula (3)

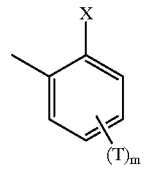

Formula (4)

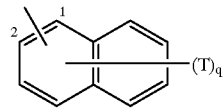

wherein:
X and each T independently is a substituent other than H;
m is 0 to 4; and
q is 0 to 7.

Preferably q is 0 to 3, more preferably 0 or 1 and especially 0. m is preferably 0 or 1, more preferably 0.

Preferably X and each T independently are selected from the preferred groups described above for B or COOH, more preferably a group B as hereinbefore defined.

It is especially preferred that each T independently is —SO$_3$H, —CF$_3$, —NH$_2$, halo, —NHCOC$_{1-4}$-alkyl (preferably —NHCOCH$_3$), C$_{1-6}$-alkoxy, —SO$_2$NHC$_{1-4}$-alkyl, —SO$_2$NHC$_{1-4}$-hydroxyalkyl or C$_{1-6}$-alkyl optionally substituted by —OH, —COOH, —NH$_2$ or —SO$_3$H.

It is especially preferred that X is —SO$_3$H, —CF$_3$, —NH$_2$, halo, C$_{1-6}$-alkoxy or C$_{1-6}$-alkyl optionally substituted by —OH, —COOH, —NH$_2$ or —SO$_3$H. More especially X is C$_{1-4}$-alkyl, C$_{1-4}$-alkoxy, —Cl, —Br or —OH, particularly methyl or —Cl.

When L is of the Formula (4), the naphthyl group is preferably attached at the 1-, or more preferably 2-position to the carbonyl group shown in Formula (1).

It is especially preferred that L is of the Formula (3), wherein m=0.

The floating sulpho group shown in Formula (1) is preferably attached meta to the —NR$^1$— group.

In view of the foregoing preferences, a preferred compound according to the first aspect of the present invention is of the Formula (5) or a salt thereof:

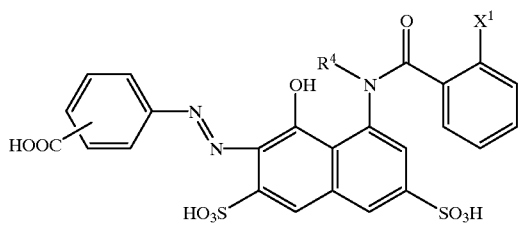

Formula (5)

wherein:
X$^1$ is —SO$_3$H, —CF$_3$, —NH$_2$, halo, C$_{1-4}$-alkoxy or C$_{1-6}$-alkyl optionally substituted by —OH, —COOH, —NH$_2$ or —SO$_3$H; and
R$^4$ is H or C$_{1-4}$-alkyl optionally substituted by —OH, —COOH or —SO$_3$H.

X$^1$ is preferably halo (especially F, Cl or Br), C$_{1-6}$-alkyl or —SO$_3$H, more preferably C$_{1-4}$-alkyl, C$_{1-4}$-alkoxy, —SO$_3$H, —Cl or —Br, particularly C$_{1-4}$-alkyl, —Cl or —SO$_3$H and especially —Cl or—SO$_3$H.

The —COOH group shown in Formula (5) is preferably attached ortho to the azo group.

Especially preferred compounds of the Formula (5) are those in which the —COOH group is attached ortho to the azo group; R$^4$ is H or C$_{1-4}$-alkyl; and X$^1$ is —Cl, C$_{1-4}$-alkyl (especially methyl or ethyl) or —SO$_3$H.

The compounds of the invention exhibit a high solubility in aqueous media and provide prints which exhibit good light-fastness and chroma when incorporated into inks for ink jet printing. We have found that the presence of the substituent X in Formula (3) and X$^1$ in Formula (5) provides compounds with a particularly high light-fastness.

The compounds of the invention may be in the free acid or salt form. Preferred salts are water-soluble, for example alkali metal salts, especially lithium, sodium and potassium salts, ammonium and substituted ammonium salts. Especially preferred salts are salts with sodium, lithium, ammonia and volatile amines. The compounds may be converted into a salt using known techniques. For example, an alkali metal salt may be converted into a salt with ammonia or an amine by dissolving an alkali metal salt in water, acidifying with a mineral acid, adjusting the pH of the solution to pH 9 to 9.5 with ammonia or the amine and removing the alkali metal cations by dialysis, reverse osmosis or ultrafiltration.

The compounds of the invention may be prepared using conventional techniques for the preparation of azo dyes. For example a suitable method comprises coupling the diazonium salt of an amine of the formula Ar$^1$NH$_2$ with a compound of the Formula (6), preferably under mildly alkaline reaction conditions:

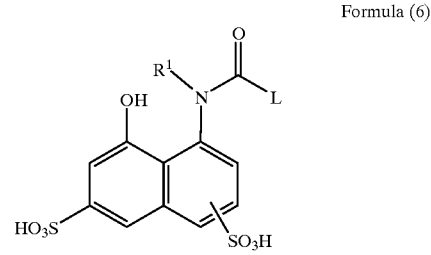

Formula (6)

wherein, L, Ar$^1$ and R$^1$ are as hereinbefore defined.

The coupling reaction is preferably performed in a liquid medium, more preferably an aqueous medium and especially water. A reaction temperature in the range of from −5° C. to 20° C. is preferred, more preferably from 0 to 10° C. Preferably a reaction time of 1 to 48, more preferably 3 to 24 hours is used.

The coupling reaction is preferably performed in the presence of a base. The base may be any inorganic base for example, ammonia, an alkali metal or alkali earth metal hydroxide, carbonate or bicarbonate, or an organic base. Preferred organic bases are tertiary amines for example, N-alkylated heterocycles, for example N-(C$_{1-4}$-alkyl) morpholine, N-(C$_{1-4}$-alkyl)piperidine, N,N'-di(C$_{1-4}$-alkyl) piperazine; tri(C$_{1-4}$-alkyl)amines, for example triethylamine, and optionally substituted pyridines, especially pyridine.

The amount of base used may be varied between wide limits but it is preferred to use less than 40, more preferably less than 10 and especially from 3 to 5 moles for each mole of the compound of Formula (6).

After the coupling reaction the product may be isolated by precipitating the product as a salt from the reaction mixture for example by the addition of a suitable alkali metal salt, especially sodium chloride. Alternatively, the product may be isolated in its free acid form by acidifying the reaction mixture, preferably using a mineral acid, especially hydrochloric acid. Where the product precipitates as a solid it may be separated from the mixture by filtration.

If desired unwanted anions may be removed from the product of the above process by dialysis, osmosis, ultrafiltration or a combination thereof.

The diazotisation of the amine of the formula Ar$^1$NH$_2$ is preferably performed in an aqueous medium at a pH below 7 in the presence of a suitable diazotisation agent. Dilute mineral acid, e.g. HCl or H$_2$SO$_4$, is preferably used to achieve the desired acidic conditions. Conveniently the diazotisation agent is formed in-situ, for example by dissolving an alkali metal nitrite, preferably sodium nitrite, in a molar excess of mineral acid, preferably HCl. Normally at least one mole of diazotisation agent per mole of the compound of formula Ar$^1$—NH$_2$, preferably from 1 to 1.25 moles, will be used in the diazotisation.

The temperature of the diazotisation is not critical and may conveniently be carried out at from −5° C. to 20° C., preferably from 0 to 10° C. and especially from 0 to 5° C.

The compound of the Formula (6) may be prepared using conventional techniques, for example by condensing a compound of the Formula LC(O)Cl with a compound of the Formula (7):

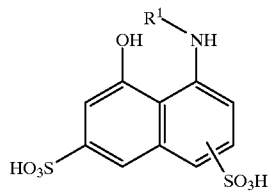

Formula (7)

wherein L and $R^1$ are as hereinbefore defined.

The compounds of Formula (1) may exist in tautomeric forms other than those shown in this specification, for example the hydrazo tautomer. These tautomers are included within the scope of the present claims.

The present invention also covers mixtures comprising two or more dyes of the Formula (1).

According to a second aspect of the present invention there is provided a composition comprising:

(a) one or more compound according to the first aspect of the present invention; and
(b) one or more water-soluble magenta dye other than a compound according to the first aspect of the invention.

The water-soluble magenta dye is preferably a xanthene dye, or an azo or bis azo dye, more preferably an anionic azo or bis azo dye and especially an azo or bis azo dye which contains one or more groups selected from sulphonate, carboxylate and thiocarboxylate groups.

Preferred water-soluble magenta dyes include C.I. Acid Red 50, 52, 87, 91, 92, 95, 249 and 289; C.I. Direct Violet 106 and 107; compounds 100 to 107, 200 and 201 described on pages 8 and 9 of WO 96/24636; compounds 1 to 24 shown described on cols. 4 to 10 in U.S. Pat. No. 5,542,970; compounds 1 to 55 described on pages 7 to 17 of EP-A-682 088; compounds 1 to 14 shown in Example 1 to 6 of EP-A-194,885; compounds 1 to 24 described on pages 8 to 13 of EP-A-717 089; the compounds described in examples 1 to 16 in cols 5 to 11 of U.S. Pat. No. 5,262,527; the dyes described in Examples 1 to 21 in WO 94/16021; and one or more dyes of the Formula (8) and salts thereof:

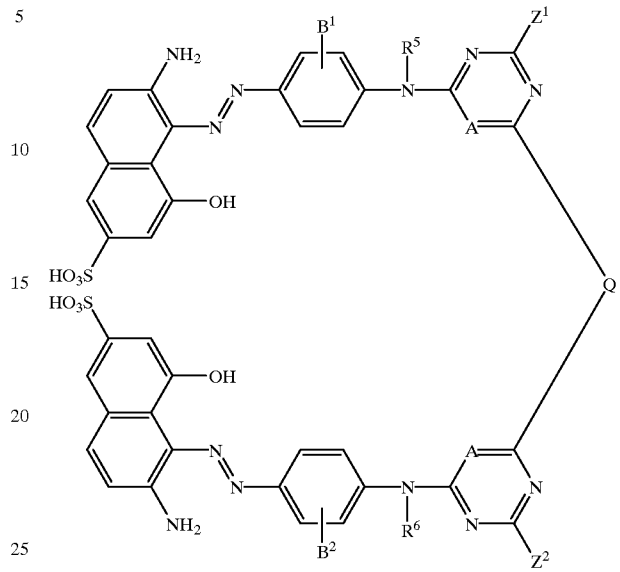

Formula (8)

wherein:

$B^1$ and $B^2$ are, each independently, —$SO_3H$, —COOH, —$CF_3$, alkoxy, alkyl or —$PO_3H_2$;

Q is an organic linking group;

$R^5$ and $R^6$ are, each independently, H or optionally substituted alkyl;

each A independently is N, C—Cl, C—CN or C—$NO_2$;

$Z^1$ and $Z^2$ are, each independently, —$SR^7$, —$OR^8$, —$NR^9R^{10}$ or halogen;

$R^7$, $R^8$, $R^9$ & $R^{10}$ are, each independently, H, optionally substituted alkyl, optionally substituted aryl or optionally substituted aralkyl; or $R^9$ and $R^{10}$ together with the nitrogen to which they are attached, form an optionally substituted five or six membered ring;

Especially preferred water-soluble magenta dyes for use in the composition according to the second aspect of the invention include C.I. Acid Red 52, C.I. Acid Red 289 or a dye of the Formula (9), (10) or (11), or a salt of any of the foregoing:

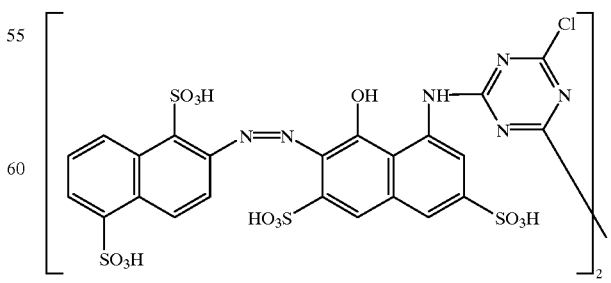

Formula (9)

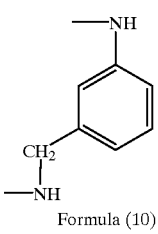

Formula (10)

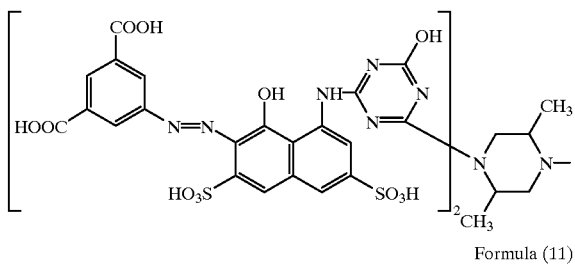

Formula (11)

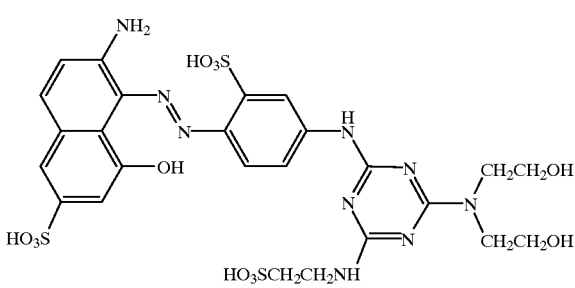

The dye of Formula (9) may be prepared using the method described in Example 1 of EP 0 559 310. The dye of the Formula (10) may be prepared using the method described in Example 3 of PCT publication number WO 94/16021. The dye of Formula (11) may be prepared using the method described in Example 1 of WO 96/24636.

The composition according to the second aspect of the present invention preferably comprises:
(a) from 1 to 99, more preferably from 3 to 70 and especially from 5 to 50 parts in total of the compound(s) according to the first aspect of the invention; and
(b) from 99 to 1, more preferably from 30 to 97 parts and especially 95 to 50 parts in total of the water-soluble magenta dye(s);
wherein the parts are by weight and the sum of the parts (a) and (b)=100.

The composition may contain a single dye of Formula (1) or a mixture thereof.

Similarly, the composition may contain a single water-soluble magenta dye or a mixture of two or more water-soluble magenta dyes.

According to a third aspect of the present invention there is provided a liquid composition comprising:
(a) a compound according to the first aspect of the present invention, or a composition according to the second aspect of the invention; and
(b) a liquid medium.

Preferred compounds comprising component (a) of the liquid composition are the preferred compounds according to the first aspect of the invention, more preferably one or more compounds of the Formula (1) or Formula (5), as hereinbefore defined.

The liquid medium is preferably a low melting point solid, water, a mixture of water and an organic solvent or an organic solvent. More preferably the medium comprises (i), (ii) or (iii):

(i) a mixture of water and an organic solvent;
(ii) an organic solvent free from water; or
(iii) a low melting point solid.

The number of parts by weight of component (a) of the liquid composition is preferably from 0.01 to 30, more preferably 0.1 to 20, especially from 0.5 to 15, and more especially from 1 to 5 parts. The number of parts by weight of component (b) is preferably from 99.99 to 70, more preferably from 99.9 to 80, especially from 99.5 to 85, and more especially from 99 to 95 parts. The number of parts (a)+(b) is preferably 100.

When the medium is a mixture of water and an organic solvent or an organic solvent free from water, preferably component (a) is completely dissolved in component (b). Preferably component (a) has a solubility in component (b) at 20° C. of at least 10%. This allows the preparation of concentrates which may be used to prepare more dilute compositions and inks and reduces the chance of the compound(s) of component (a) of the composition precipitating if evaporation of the liquid medium occurs during storage.

When the medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

The liquid compositions according to this aspect of the invention are particularly useful as an ink or a coloured concentrate which may be used to prepare an ink. When the liquid composition is used as a coloured concentrate to prepare an ink, the ink is preferably prepared by diluting the coloured concentrate with a suitable liquid medium, preferably one of the hereinbefore described liquid media. It is preferred however, that the liquid composition according to the third aspect of the invention is an ink, more preferably an ink jet printing ink.

Examples of further suitable ink media comprising a mixture of water and one or more organic solvents are described in U.S. Pat. No. 4,963,189, U.S. Pat. No. 4,703, 113, U.S. Pat. No. 4,626,284, EP 425,150A and U.S. Pat. No. 5,207,824.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the component (a) of the composition in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, such as ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability. This is particularly so when the liquid composition is used as an ink, especially an ink jet printing ink.

Ink media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$ chains, and sulphonamides. The compound of Formula (1) or Formula (3) may be dissolved in the low melting point solid or may be finely dispersed in it.

The compounds according to the present invention exhibit a high solubility in aqueous media, accordingly it is preferred that the liquid medium is a mixture of water and one or more water miscible organic solvent(s). An especially preferred liquid composition which is suitable for use as an ink for an ink jet printer comprises:
(a) from 1 to 10 parts in total of a compound or composition according to the first or second aspect of the invention;
(b) from 2 to 60, more preferably 5 to 40 parts of water-soluble organic solvent; and
(c) from 30 to 97, more preferably 40 to 85 parts water;
wherein all parts are by weight and the sum of the parts (a)+(b)+(c)=100.

The liquid compositions according to this third aspect of the invention may also contain additional components conventionally used in ink jet printing inks, for example viscosity and surface tension modifiers, corrosion inhibitors, biocides, kogation reducing additives, anti-cockle agents to reduce paper curling and surfactants which may be ionic or non-ionic.

The pH of the liquid composition is preferably from 4 to 10.

The compounds, compositions and liquid compositions according to the first and second aspects of the present invention may be, and preferably are, purified to remove undesirable impurities before they are incorporated into inks for ink jet printing. Conventional purification techniques may be employed, for example ultrafiltration, reverse osmosis, dialysis or a combination thereof.

The liquid composition according to the third aspect of the invention preferably have a concentration of less than 100 parts per million, more preferably less than 50 parts per million, in total of undesirable ions, for example halide ions, silicon ions, peroxide radicals and divalent and trivalent metals, especially calcium ions. Such liquid compositions are particularly well suited to use as ink jet printing inks because higher levels of undesirable ions could lead to printing problems, especially in thermal ink jet printing heads.

A fourth aspect of the present invention provides a process for printing an image on a substrate comprising applying thereto by means of an ink jet printer an ink containing a compound according to the first aspect of the invention or a composition according to the second aspect of the invention.

The ink used in this process is preferably a liquid composition according to the third aspect of the present invention.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character. Examples of commercially available papers include, HP Premium Coated Paper, HP Photopaper (all available from Hewlett Packard Inc), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP Glossy Paper, Canon HG 101 High Gloss Film (all available from Canon Inc.), Wiggins Conqueror paper (available from Wiggins Teape Ltd), Xerox Acid Paper and Xerox Alkaline paper, Xerox Acid Paper (available from Xerox).

A fifth aspect of the present invention provides a substrate, preferably a paper, an overhead projector slide or a textile material, printed with a liquid composition according to the third aspect of the present invention or by means of the process according to the fourth aspect of the present invention.

According to a sixth aspect of the present invention there is provided an ink jet printer cartridge comprising a chamber and ink, wherein the ink is present in the chamber and the ink contains a compound or a composition according to the first or second aspect of the invention. Preferably the ink is a liquid composition according to the third aspect of the invention.

According to a seventh aspect of the present invention there is provided an ink jet printer containing an ink jet printer cartridge, wherein the ink jet printer cartridge is as defined in the sixth aspect of the present invention.

The invention is further illustrated by the following Examples in which all parts and percentages are by weight unless otherwise stated.

EXAMPLE 1

Dye (1)

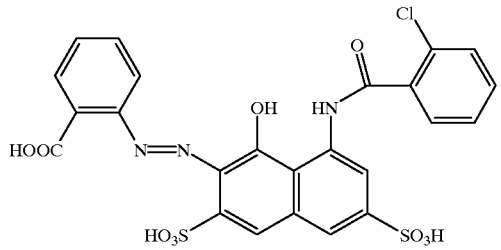

Dye 1 was prepared in accordance with following process:

Stage (a): Diazotisation

Anthranilic acid (7.0 g, 0.05 moles) was dissolved in water (100 mls) and concentrated hydrochloric acid (20 mls). The solution was cooled to 0–5° C. and sodium nitrite (4.0 g, 0.06 moles) was added in small portions. The solution was stirred a further 1.5 hours at 0–5° C., then the excess nitrous acid destroyed by the addition of saturated sulphamic acid solution.

Stage (b): Coupling 2-chlorobenzoyl H acid (28.6 g at 76%, 0.05 moles) was suspended in water (200 mls) and dissolved by the addition of 2M sodium hydroxide to pH 7.5. The solution was screened and then added to the product of stage (a) over 10 minutes at 0–5° C. The mixture was stirred for 1 hour at 0–5° C. then allowed to rise to ambient and stirred a further 2 hours. The product was filtered off and washed with 10% brine (2×100 mls), then saturated brine (500 mls). The title product was washed with acetone (300 mls) and then oven dried at 50° C.

EXAMPLE 2

Dye 2

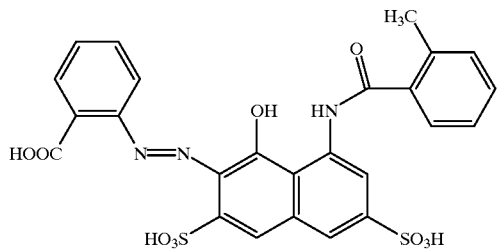

Dye (2) was prepared using the same method described above for the preparation of Dye (1), except the 2-chlorobenzoyl chloride used in Example 1 was replaced with 2-methylbenzoyl chloride.

EXAMPLE 3 INKS AND INK JET PRINTING

Ink

An ink comprising 3 parts of Dye (1) from Example 1 and 97 parts of an ink medium comprising:

10 parts butyl Carbitol™ [2-(2-butyoxyethoxy)ethanol];
10 parts glycerol;
1 part Surfynol™ 465 (a non-ionic surfactant available from Air Products Inc.);
79 parts water was prepared by dissolving Dye (1) is the medium and filtering the resultant ink through a 0.45 μm filter.

Ink Jet Printing

The ink was loaded into an Seiko Epson Stylus Colour Pro ink jet printer and was ink jet printed onto each of the substrates shown in column 1 of Table 1. The resulting prints were a bright magenta shade with a high water-fastness. The prints exhibited the reflected optical density shown under "ROD" in Table 1, as measured using an X-Rite™ 938 Spectrodensitometer.

The light-fastness of each print was assessed by exposing a portion of each print to 50 hours fading in an Atlas Ci-35a Weatherometer and measuring the colour difference (ΔE) between the faded and un-faded portions of the print using an X-Rite™ Spectrodensitometer. The measured ΔE values are shown in column 3 of Table 1. A small ΔE value corresponds to a small colour difference and hence a high light-fastness.

TABLE 1

| Substrate | ROD | ΔE (after 50 hours) |
|---|---|---|
| X. Acid | 1.002 | 4.15 |
| S. Coated | 1.094 | 3.85 |
| S. Glossy Paper | 1.54 | 10.41 |
| S. Glossy Film | 1.665 | 8.19 |

In Table 1 the following abbreviations are used:
X. Acid = Xerox Acid paper
S. Coated = Seiko Epson Coated paper
S. Glossy Paper = Seiko Epson Glossy paper
S. Glossy Film = Seiko Epson Glossy Film

EXAMPLE 4

Further dyes of Formula (A) may be prepared using the same method described for the preparation of Dye (1), except in place of the 2-chlorobenzoyl chloride used in Example 1 there is used the benzoyl chloride shown in Table 2.

TABLE 2

| Dye | Benzoyl Chloride |
|---|---|
| Dye (3) | (2,5-dichlorobenzoyl chloride structure) |
| Dye (4) | (2,6-dichlorobenzoyl chloride structure) |

TABLE 2-continued

| Dye | Benzoyl Chloride |
|---|---|
| Dye (5) | 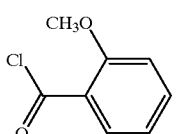 |
| Dye (6) | 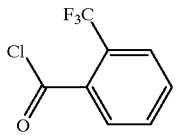 |
| Dye (7) | 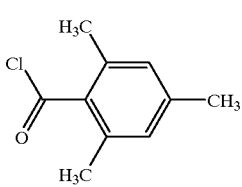 |
| Dye (8) | 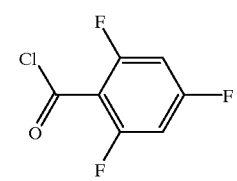 |

EXAMPLE 5

The inks described in Tables 3, 4, 5 and 6 may be prepared wherein the Dye described in the first column is the Dye described in the above Examples. Numbers quoted in the second column onwards refer to the number of parts of the relevant ingredient and all parts are by weight. The inks may be applied to paper by thermal or piezo ink jet printing.

The following abbreviations are used in Tables 3, 4, 5 and 6:

PG = propylene glycol
NMP = N-methyl pyrrolidone
CYC = cyclohexanol
P12 = propane-1,2-diol
CET = cetyl ammonium bromide
TBT = tertiary butanol
GLY = glycerol
PEG 200 = Polyethylene glycol (average molecular weight of 200)
H-1,6 = Hexane 1,6-diol
CAP-L = caprolactam
DEG-MBE = diethylene glycol monobutyl ether
EG = ethylene glycol DEG = diethylene glycol
TFP = 2,2,3,3-tetrafluoropropanol
2P = 2-pyrrolidone
UR = Urea
PHO = $Na_2HPO_4$ and
TDG = thiodiglycol
P-1,5 = Pentane-1,5-diol CAP = caprolactone
TEA = triethanolamine BUT = γ-butyrolactone

TABLE 3

| Ink | Dye | Dye Content | Water | PG | DEG | NMP | P-1,5 | TEA | CYC | BUT | CAP | EG | CAP-L |
|---|---|---|---|---|---|---|---|---|---|---|---|---|---|
| 1 | 1 | 3.0 | 90 |  | 5 |  | 4.8 | 0.2 |  |  |  |  |  |
| 2 | 2 | 10.0 | 85 | 3 |  | 3 | 3 |  |  | 5 |  |  |  |
| 3 | 2 | 2.1 | 91 |  | 8 |  |  |  |  |  |  | 1 | 1 |
| 4 | 1 | 3.1 | 86 | 5 |  |  |  | 0.2 | 4 |  |  |  | 4.8 |
| 5 | 2 | 1.1 | 81 |  |  | 9 |  | 0.5 | 0.5 |  |  |  |  |
| 6 | 1 | 2.5 | 60 | 4 | 15 | 3 | 3 |  |  | 6 |  | 9 | 4 |
| 7 | 1 | 5 | 65 |  | 20 |  | 5 |  |  | 10 |  | 5 |  |
| 8 | 1 | 2.4 | 75 | 5 | 4 |  | 5 |  |  |  | 6 |  | 5 |
| 9 | 2 | 4.1 | 80 | 3 | 5 | 2 | 9.7 | 0.3 |  |  |  |  |  |
| 10 | 1 | 3.2 | 65 |  | 5 | 4 | 6 |  |  | 5 | 4 |  | 5 |
| 11 | 2 | 5.1 | 96 |  |  |  |  |  |  |  | 4 | 6 |  |
| 12 | 2 | 10.8 | 90 | 5 |  |  |  |  |  | 5 |  |  |  |
| 13 | 1 | 10.0 | 80 | 2 | 6 | 2 | 5 |  |  | 1 |  |  |  |
| 14 | 2 | 1.8 | 80 |  | 5 |  |  |  |  |  |  | 4 |  |
| 15 | 1 | 2.6 | 84 |  |  | 11 |  |  |  |  |  | 15 |  |
| 16 | 1 | 3.3 | 80 | 2 |  |  | 10 |  |  |  | 2 | 5 | 6 |
| 17 | 2 | 12.0 | 90 |  |  | 7 |  | 0.3 |  | 2.7 |  |  |  |
| 18 | 2 | 5.4 | 69 | 2 | 20 | 2 | 1 |  |  |  |  | 3 | 3 |

TABLE 4

| Ink | Dye | Dye Content | Water | GLY | DEG | NMP | CET | TBT | TDG | UR | PHO | 2P | PI2 |
|---|---|---|---|---|---|---|---|---|---|---|---|---|---|
| 19 | 1 | 3.0 | 80 | 15 | | | 0.2 | | | | | 4.8 | |
| 20 | 2 | 9.0 | 90 | | 5 | | | | | | 1.2 | | 5 |
| 21 | 1 | 1.5 | 85 | 3.8 | 5 | | 0.16 | 4.64 | 0.2 | | | | |
| 22 | 1 | 2.5 | 90 | | 6 | 3.88 | | | | | | 0.12 | |
| 23 | 2 | 3.1 | 82 | 4 | 8 | | 0.3 | | | | | | 5.7 |
| 24 | 2 | 0.9 | 85 | | 10 | | | | | 4.8 | 0.2 | | |
| 25 | 1 | 8.0 | 90 | | 4.7 | 5 | | | 0.3 | | | | |
| 26 | 1 | 4.0 | 70 | | 10 | 4 | | | | 1 | | 4 | 11 |
| 27 | 1 | 2.2 | 75 | 4 | 10 | 3 | | | | 2 | | 6 | |
| 28 | 2 | 10.0 | 91 | | | 6 | | | | | | 3 | |
| 29 | 2 | 9.0 | 76 | | 9 | 7 | | | 2.05 | | 0.95 | 5 | |
| 30 | 1 | 5.0 | 78 | 5 | 11 | | | | | | | 6 | |
| 31 | 1 | 5.4 | 86 | | | 7 | | | | | | 7 | |
| 32 | 2 | 2.1 | 70 | 5 | 5 | 5 | 0.1 | 0.2 | 0.1 | 5 | 0.1 | 9.5 | |
| 33 | 1 | 2.0 | 90 | | 10 | | | | | | | | |
| 34 | 1 | 2 | 88 | | | 2 | | | 10 | | | | |
| 35 | 2 | 5 | 78 | | | 5 | | | 12 | | | 5 | |
| 36 | 2 | 8 | 70 | 2 | | 8 | | | 15 | | | 5 | |
| 37 | 2 | 10 | 80 | | | | | | 8 | | | 12 | |
| 38 | 1 | 10 | 80 | | 10 | | | | | | | | |

TABLE 5

| Ink | Dye | Dye Content | Water | PEG 200 | DEG-MBE | NMP | H-1,6 | TEA | TFP | BUT | CAP | EG | CAP-L |
|---|---|---|---|---|---|---|---|---|---|---|---|---|---|
| 39 | 1 | 2.0 | 80 | 5 | 6 | 4 | | | | | | 5 | |
| 40 | 2 | 3.0 | 90 | | | 5 | 4.8 | | 0.2 | | | | |
| 41 | 2 | 10.0 | 85 | 3 | | 3 | 3 | | | 5 | | 1 | |
| 42 | 1 | 2.1 | 91 | | 8 | | | | | | | | 1 |
| 43 | 1 | 3.1 | 86 | 5 | | | | | 0.2 | 3.8 | | | 5 |
| 44 | 1 | 1.1 | 81 | | | 9 | | 0.5 | 0.5 | | | 9 | |
| 45 | 2 | 2.5 | 60 | 4 | 15 | 3 | 3 | | | 6 | | 5 | 4 |
| 46 | 2 | 5 | 65 | | 20 | | | | | 10 | | | |
| 47 | 2 | 2.4 | 75 | 5 | 4 | 5 | | | | | 6 | | 5 |
| 48 | 1 | 4.1 | 80 | 3 | 5 | 2 | 9.7 | | 0.3 | | | | |
| 49 | 1 | 3.2 | 70 | | 5 | 4 | 6 | | | 5 | 4 | 6 | 5 |
| 50 | 2 | 5.1 | 96 | | | | | | | | 4 | | |
| 51 | 1 | 10.8 | 90 | 5 | | | | | | 5 | | | |
| 52 | 2 | 10.0 | 80 | 2 | 6 | 2 | 5 | | | 1 | | 4 | |
| 53 | 2 | 1.8 | 80 | | | 5 | | | | | | 15 | |
| 54 | 1 | 2.6 | 84 | | | 11 | | | | | | 5 | |
| 55 | 2 | 3.3 | 80 | 2 | | | 10 | | | | 2 | | 6 |
| 56 | 1 | 12.0 | 90 | | | | 7 | 0.3 | | 2.8 | | | |
| 57 | 1 | 5.4 | 69 | 2 | 20 | 2 | 1 | | | | | 3 | 3 |
| 58 | 2 | 6.0 | 91 | | | 4 | | | | | | 5 | |

TABLE 6

| Ink | Dye | Dye Content | Water | PEG 200 | DEG-MBE | NMP | H-1,6 | TEA | TFP | BUT | CAP | EG | CAP-L |
|---|---|---|---|---|---|---|---|---|---|---|---|---|---|
| 59 | 1 | 2.0 | 80 | 5 | | 6 | 4 | | | | | 5 | |
| 60 | 2 | 3.0 | 90 | | 5 | | 4.8 | | 0.2 | | | | |
| 61 | 2 | 10.0 | 85 | 3 | | 3 | 3 | | | 5 | | 1 | |
| 62 | 1 | 2.1 | 91 | | 8 | | | | | | | | 1 |
| 63 | 1 | 3.1 | 86 | 5 | | | | | 0.2 | 3.8 | | | 5 |
| 64 | 1 | 1.1 | 81 | | | 9 | | 0.5 | 0.5 | | | 9 | |
| 65 | 2 | 2.5 | 60 | 4 | 15 | 3 | 3 | | | 6 | | 5 | 4 |
| 66 | 2 | 5 | 65 | | 20 | | | | | 10 | | | |
| 67 | 2 | 2.4 | 75 | 5 | 4 | 5 | | | | | 6 | | 5 |
| 68 | 1 | 4.1 | 80 | 3 | 5 | 2 | 9.7 | | 0.3 | | | | |
| 69 | 1 | 3.2 | 70 | | 5 | 4 | 6 | | | 5 | 4 | 6 | 5 |
| 70 | 2 | 5.1 | 96 | | | | | | | | 4 | | |
| 71 | 1 | 10.8 | 90 | 5 | | | | | | 5 | | | |
| 72 | 2 | 10.0 | 80 | 2 | 6 | 2 | 5 | | | 1 | | 4 | |
| 73 | 2 | 1.8 | 80 | | | 5 | | | | | | 15 | |
| 74 | 1 | 2.6 | 84 | | | 11 | | | | | | 5 | |

TABLE 6-continued

| Ink | Dye | Dye Content | Water | PEG 200 | DEG-MBE | NMP | H-1,6 | TEA | TFP | BUT | CAP | EG | CAP-L |
|---|---|---|---|---|---|---|---|---|---|---|---|---|---|
| 75 | 2 | 3.3 | 80 | 2 | | | 10 | | | | 2 | | 6 |
| 76 | 1 | 12.0 | 90 | | | | 7 | 0.3 | | 2.8 | | | |
| 77 | 1 | 5.4 | 69 | 2 | 20 | 2 | 1 | | | | | 3 | 3 |
| 78 | 2 | 6.0 | 91 | | | 4 | | | | | | 5 | |

What is claimed is:

1. A compound of Formula (1) and salts thereof:

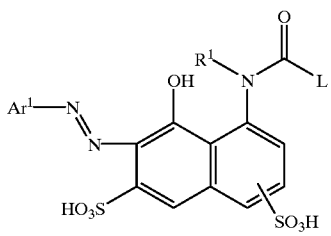

Formula (1)

wherein:
Ar¹ is substituted aryl carrying at least one —COOH group;
R¹ is H or optionally substituted alkyl;
L is substituted phenyl carrying at least one substituent at the 2-position, or optionally substituted naphthyl.

2. A compound according to claim 1 wherein Ar¹ is a group of the Formula (2):

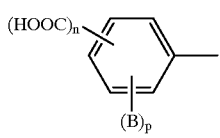

Formula (2)

wherein:
each B independently is a substituent other than H;
p is 0 to 4;
n is 1 or 2; and
(n+p) is 5 or less.

3. A compound according to claim 1 wherein L is of the Formula (3) or (4):

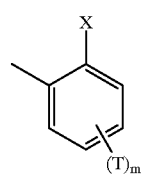

Formula (3)

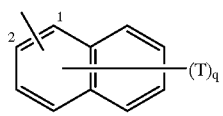

Formula (4)

wherein:
X and each T independently is a substituent other than H;

is 0 to 4; and
q is 0 to 7.

4. A compound according to claim 1 of the Formula (5) and salts thereof:

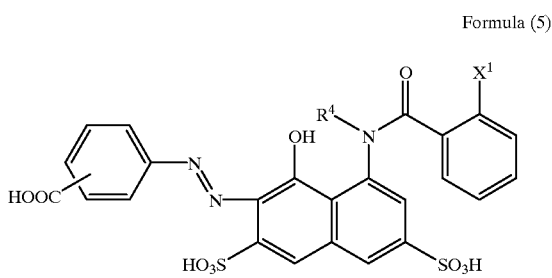

Formula (5)

wherein:
X¹ is —SO₃H, —CF₃, —NH₂, halo, $C_{1-6}$-alkoxy or $C_{1-6}$-alkyl optionally substituted by —OH, —COOH, —NH₂ or —SO₃H; and
R⁴ is H or $C_{1-4}$-alkyl optionally substituted by —OH, —COOH or —SO₃H.

5. A compound according to claim 4 wherein the —COOH group is attached ortho to the azo group; R⁴ is H or $C_{1-4}$-alkyl; and X¹ is —Cl, $C_{1-4}$-alkyl or —SO₃H.

6. A composition comprising:
(a) one or more compound according to any one of claims 1 to 5; and
(b) one or more water-soluble magenta dye other than a compound according to any one of claims 1 to 5.

7. A liquid composition comprising:
(a) a compound according to any one of claims 1 to 5; and
(b) a liquid medium.

8. A liquid composition according to claim 7 wherein the liquid medium comprises (i), (ii) or (iii):
(i) a mixture of water and an organic solvent;
(ii) an organic solvent free from water; or
(iii) a low melting point solid.

9. A liquid composition according to claim 7 which is an ink.

10. A process for printing an image on a substrate comprising applying thereto by means of an ink jet printer an ink containing a compound according to any one of claims 1 to 5.

11. A substrate printed with a liquid composition according to claim 7.

12. A substrate printed by means of the process according to claim 10.

13. An ink jet printer cartridge comprising a chamber and ink, wherein the ink is present in the chamber and the ink contains a compound according to any one of claims 1 to 5.

14. An ink jet printer containing an ink jet printer cartridge, wherein the ink jet printer cartridge is as defined in claim 13.

* * * * *